United States Patent
King et al.

(10) Patent No.: US 9,417,155 B1
(45) Date of Patent: Aug. 16, 2016

(54) CALCAREOUS DEPOSIT WIPE-TEST APPARATUS AND METHOD

(71) Applicants: Kevin C King, Upper Chichester, PA (US); Raymond J Bauer, Lafayette Hill, PA (US); David Guimond, Stevensville, MD (US)

(72) Inventors: Kevin C King, Upper Chichester, PA (US); Raymond J Bauer, Lafayette Hill, PA (US); David Guimond, Stevensville, MD (US)

(73) Assignee: The United State of America as represented by the Secretary of the Navy, Washington, DC (US)

( * ) Notice: Subject to any disclaimer, the term of this patent is extended or adjusted under 35 U.S.C. 154(b) by 280 days.

(21) Appl. No.: 14/310,056

(22) Filed: Jun. 20, 2014

(51) Int. Cl.
*B63B 59/06* (2006.01)
*G01M 13/00* (2006.01)

(52) U.S. Cl.
CPC ............. *G01M 13/00* (2013.01); *B63B 59/06* (2013.01)

(58) Field of Classification Search
CPC .... B24B 27/033; B24B 29/08; B24B 49/183; B08B 1/04; G01M 13/00; B63B 59/06
USPC ....................................... 73/118.04
See application file for complete search history.

(56) References Cited

U.S. PATENT DOCUMENTS

| 1,963,304 | A | * | 6/1934 | Kerr ................. | B21B 45/04 29/81.11 |
|---|---|---|---|---|---|
| 4,156,949 | A | * | 6/1979 | Ziegelmeyer ......... | B08B 9/023 15/88 |
| 4,428,090 | A | * | 1/1984 | Coggin ................ | B28B 7/386 15/93.4 |
| 5,860,179 | A | * | 1/1999 | Shipman .............. | A46B 13/02 15/104.04 |
| 5,901,400 | A | * | 5/1999 | Fulop ................. | B08B 1/02 15/88 |
| 6,508,699 | B1 | | 1/2003 | Santoriello et al. | |
| 7,752,699 | B1 | * | 7/2010 | Fruzzetti, Jr. ....... | B08B 1/04 15/104.04 |
| 7,774,887 | B2 | * | 8/2010 | Yudovsky ............ | B08B 1/04 15/77 |
| 7,941,888 | B2 | | 5/2011 | Bertoldi | |
| 8,715,424 | B2 | * | 5/2014 | Prasad ................ | B23D 79/02 134/16 |

* cited by examiner

Primary Examiner — Freddie Kirkland, III
(74) Attorney, Agent, or Firm — Dave A. Ghatt (57) ABSTRACT

A calcareous deposit wipe-test apparatus and method. The apparatus includes a motor, frame, with the motor and the replaceable cartridge attached to the frame. The replaceable cartridge includes a calcareous deposit roller for growing calcareous deposits thereon, which typically cause abrasive wear. The wipe-test apparatus also includes a trough which is filled with seawater. The frame positioned in the trough, and shaped so that when positioned in the trough, the motor is perched above in a dry location and the replaceable cartridge is below, at least partially submerged so that the calcareous deposit roller simulates shipboard wet operating conditions. The apparatus and method evaluates the removal of the calcareous deposits under shipboard working conditions.

10 Claims, 6 Drawing Sheets

CALCAREOUS DEPOSIT WIPE-TEST APPARATUS AND METHOD

STATEMENT OF GOVERNMENT INTEREST

The following description was made in the performance of official duties by employees of the Department of the Navy, and thus, the claimed invention may be manufactured, used, licensed by or for the United States Government for governmental purposes without the payment of any royalties thereon.

TECHNICAL FIELD

The following description relates generally to a calcareous deposit wipe-test apparatus and method, in particular an apparatus including a motor, frame, and removable cartridge having a calcareous deposit roller for growing calcareous deposits thereon, which typically cause abrasive wear. The apparatus and method evaluates the removal of the calcareous deposits under shipboard working conditions.

BACKGROUND

Calcareous deposits form due to Impressed Current Cathodic Protection systems used to prevent corrosion of Navy vessel hulls and shafting. The deposits are a crystalline formation of calcium carbonate and magnesium hydroxide that form due to a local PH change on the protected surface. The area of concern is the section of shaft that contacts seawater lubricated propulsion bearings. During periods of inactivity, while in port, the shaft may sit stationary for long periods allowing the deposits to accumulate. The deposits are thought to cause abrasive wear when large amounts are present, and the shaft is actuated to turn at lower speeds.

Current shipboard practices vary widely for attempting to minimize the amount of calcareous deposits that build up on propulsion shafts. Currently there is no known test apparatus to test the significance of deposits on bearing and shaft life. Little to no scientific evidence is available to determine if the wiping of deposits is successful and if the operation is completed often enough. Thus, it is desired to have an apparatus and method for evaluating the effects of calcareous deposits on ship propulsion shafts, and also possible arrangements and methods for removing these deposits.

SUMMARY

In one aspect, the invention a calcareous deposit wipe-test apparatus for testing the removal of calcareous deposits. In this aspect, the apparatus includes a motor having a motor drive shaft for transmitting rotational energy, and a replaceable cartridge having a cartridge shaft, a calcareous deposit roller for growing calcareous deposits thereon, and a spring loaded bearing coupon in biased contact with the calcareous deposit roller for removing the calcareous deposits thereon. According to the invention, the calcareous deposit wipe-test apparatus also includes a frame, and a transmission assembly extending through the frame connected to each of the motor drive shaft and the cartridge shaft for transmitting rotational energy from the motor shaft to the cartridge shaft. This results in the rotating of the calcareous deposit roller against the spring loaded bearing coupon for removing the calcareous deposits.

In another aspect, the invention is a calcareous deposit wipe-test evaluation method. The method includes the providing of a test apparatus. In this aspect, the testing apparatus is provided with a motor having a motor drive shaft for transmitting rotational energy. The test apparatus is also provided with a plurality of replaceable cartridges, each of the plurality of cartridges having a cartridge shaft, a calcareous deposit roller for growing calcareous deposits thereon, and a spring loaded bearing coupon in biased contact with the calcareous deposit roller for removing the calcareous deposits thereon. The test apparatus is also provided with a frame, wherein one of the plurality of replaceable cartridges is attached to the frame. The test apparatus also has a transmission assembly extending through the frame connected to each of the motor drive shaft and the cartridge shaft of the attached replaceable cartridge for transmitting rotational energy from the motor shaft to the cartridge shaft. The test apparatus may also include a trough with seawater therein, wherein the frame is positioned within the trough. In this aspect, the method also includes the growing of calcareous deposits on the calcareous deposit rollers of the plurality of replaceable cartridges by applying an electrical current to the respective calcareous deposit roller. The method also includes, after deposits are formed on the calcareous deposit rollers, activating the motor for a predetermined time, which via the transmission assembly, transmits rotational energy to the calcareous deposit roller of the attached replaceable cartridge, the attached calcareous deposit roller rubbing against the spring loaded bearing coupon, thereby removing the calcareous deposits thereon. In this aspect, the method also includes the evaluating of the system and making adjustments during and after the period in which the motor is activated.

BRIEF DESCRIPTION OF THE DRAWINGS

Other features will be apparent from the description, the drawings, and the claims.

DETAILED DESCRIPTION

Figure 1A:
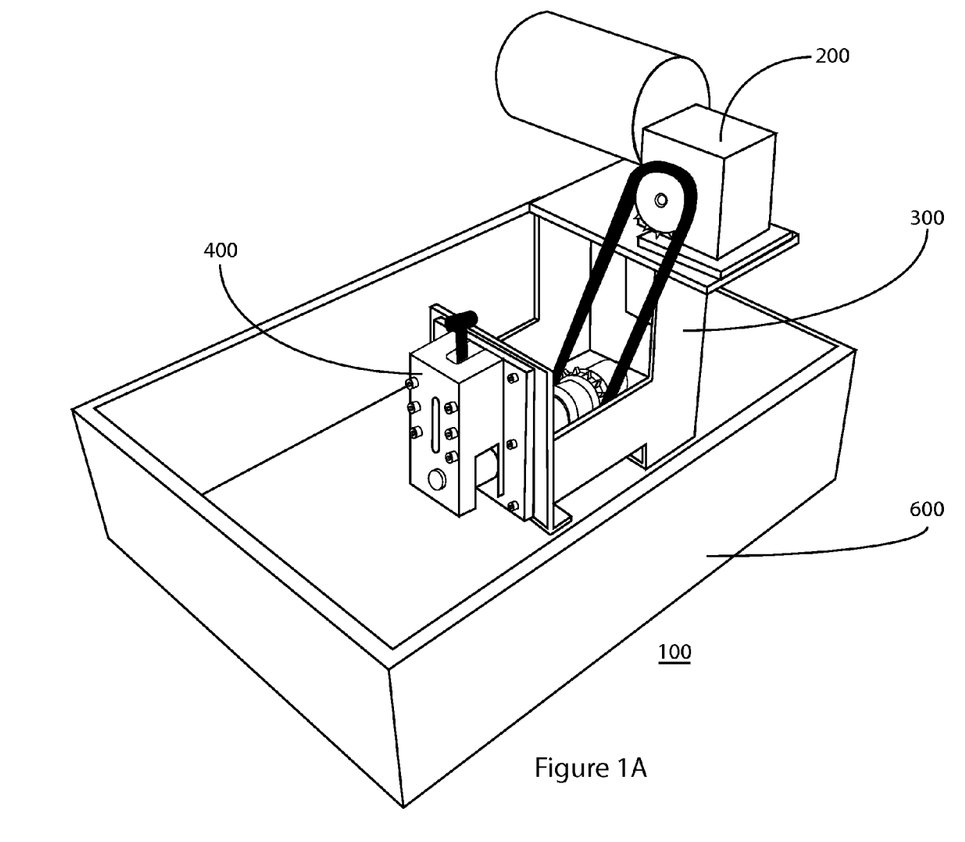
FIG. 1A is an exemplary perspective illustration of a calcareous deposit wipe-test apparatus for testing the removal of calcareous deposits, according to an embodiment of the invention.

FIG. 1A is an exemplary perspective illustration of a calcareous deposit wipe-test apparatus 100 for testing the removal of calcareous deposits, according to an embodiment of the invention. As shown, the apparatus 100 includes a motor 200, a frame 300, and a replaceable cartridge 400. The calcareous deposit wipe-test apparatus 100 also includes a transmission assembly 500 transmitting energy from the motor 200 to the replaceable cartridge 400. The apparatus 100 may also include a trough 600 in which the frame 300 rests. The trough 600 may be filled with seawater, for providing shipboard operating conditions during testing. It should be noted that "seawater" as defined herein refers to any water, naturally occurring or treated, having a known chemical composition range, consistent with that of naturally occurring seawater.

As outlined throughout the written description, the calcareous deposit wipe-test apparatus 100 is a small-scale machine used for land-based laboratory testing. The apparatus 100 is analogous to a ship propulsion shaft journal and support bearing, and is used to test calcareous wiping methodology. As outlined below, the replaceable cartridge 400 includes a bearing mounted roller, the roller allowing for calcareous deposit growth thereon. The replaceable cartridge also having a wiping member for wiping off the calcareous deposit growth, the process performed under actual shaft pressure conditions. The integrated/replaceable cartridge and mechanical turning system provides interchangeable testing at nominal equivalent propulsion shaft turning gear speeds on multiple materials directed to water lubricated bearings, without any disassembly.

Figure 1B:
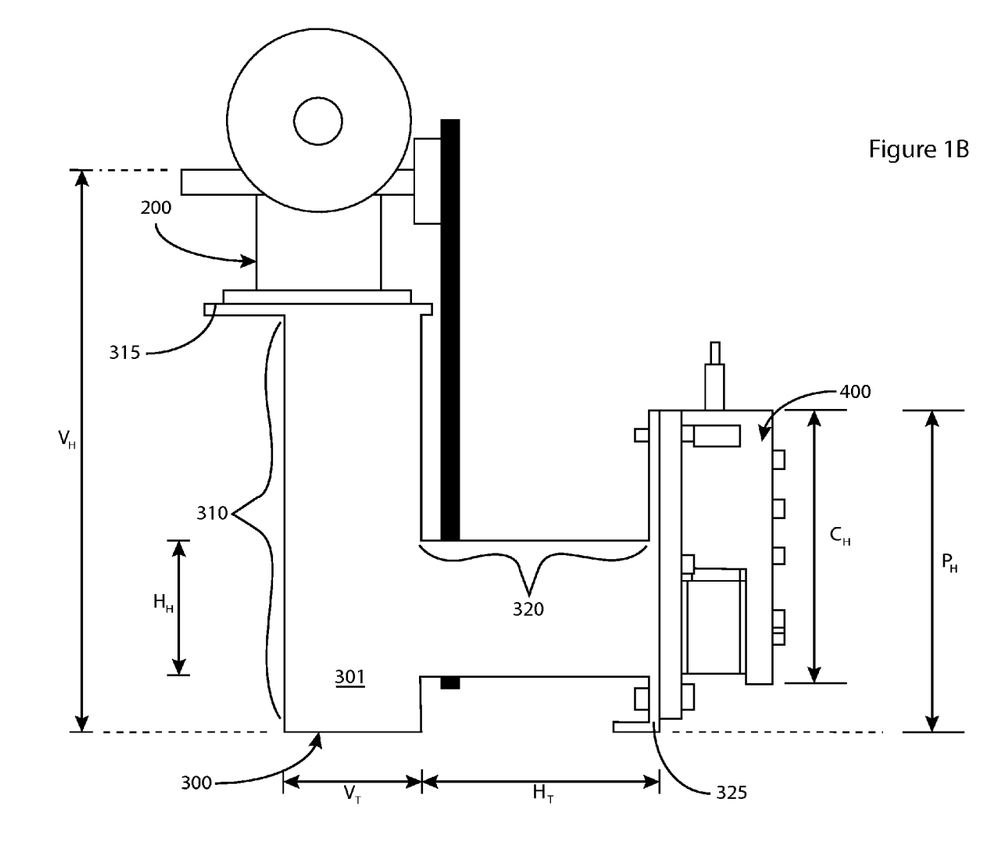
FIG. 1B is an exemplary side view of a calcareous deposit wipe-test apparatus for testing the removal of calcareous deposits, according to an embodiment of the invention.

FIG. 1B is an exemplary side view of a calcareous deposit wipe-test apparatus 100 for testing the removal of calcareous deposits, according to an embodiment of the invention. FIG. 1B shows the apparatus 100, including the motor 200, the frame 300, and the replaceable cartridge 400. FIG. 1B also shows the positioning of the motor 200 and the replaceable cartridge 400, with respect to the frame 300. The frame 300 is designed to keep the motor 200 dry during "wet" testing of the replaceable cartridge 400. As shown, the frame 300 has a substantially L-shaped chassis 301 having a vertically extending portion 310 and a horizontally extending portion 320. The frame 300 also includes a motor mounting platform 315 positioned at the top of the vertically extending portion 310 of the substantially L-shaped chassis 301, for mounting the motor 200 thereon. The frame 300 also includes a cartridge side plate 325 for removably attaching the replaceable cartridge 400.

FIG. 1B shows the vertically extending portion 310 of the frame having a height $V_H$ and a thickness $V_T$. FIG. 1B also shows the horizontally extending portion 320 having a height $H_H$ and a thickness $H_T$. As shown, the cartridge side plate 325 has a height $P_H$. According to an embodiment of the invention, the height $V_H$ is about 9.5 in., the thickness $V_T$ is about 3.0 in., the length $H_H$ of about 3.16 in., and a thickness $H_T$ of about 5.0 in. According to this embodiment, the height $P_H$ is about 7.09 in.

FIG. 1B shows the replaceable cartridge 400 mounted to the cartridge side plate 325, and the motor 200 mounted to the motor mounting platform 315 at an end of the vertically extending portion 310. Because of this arrangement, the motor 200 is positioned vertically above the replaceable cartridge 400. Thus, when in operation, the motor 200 in its perched position remains dry, whereas the replaceable cartridge 400 is at least partially submerged in water in a position in which it may stimulate the growth of calcareous deposits. Also, the replaceable cartridge 400 may be operated when at least partially submerged to simulate shipboard operating conditions during the wiping off of the calcareous deposits.

Figure 1C:
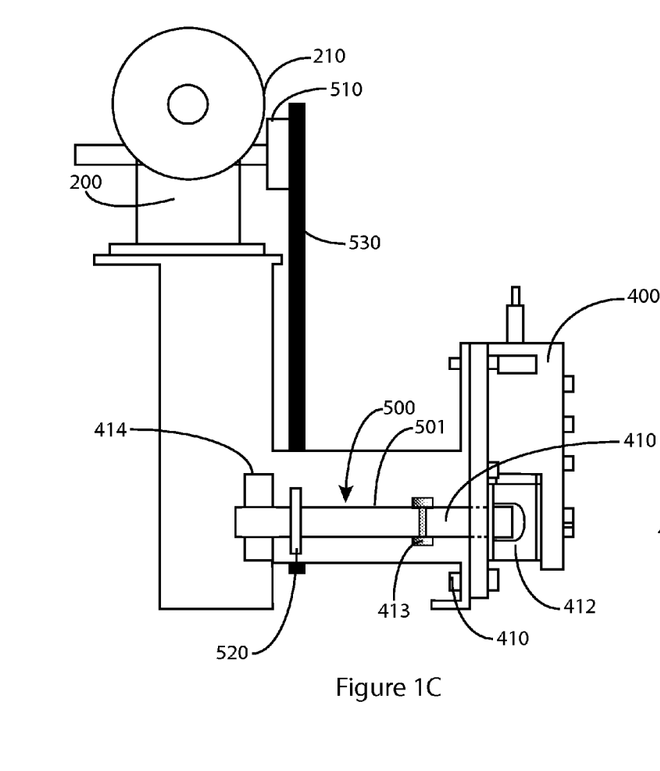
FIG. 1C is an exemplary side view of a calcareous deposit wipe-test apparatus for testing the removal of calcareous deposits, according to an embodiment of the invention.
Figure 1D:
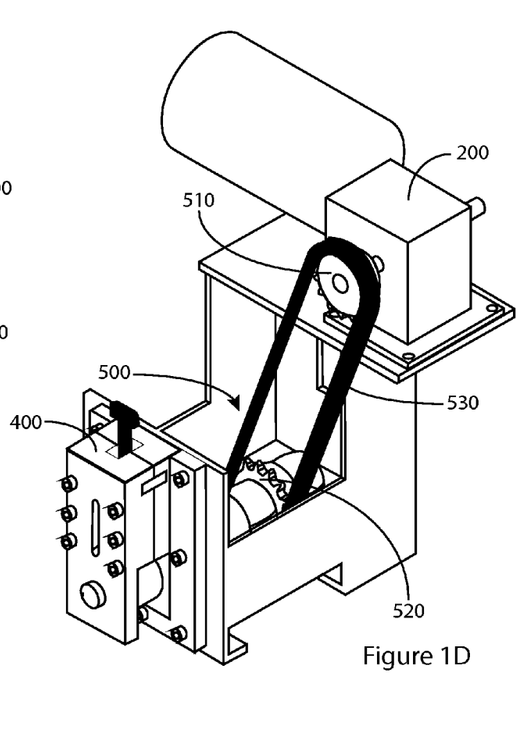
FIG. 1D is an exemplary perspective view of a calcareous deposit wipe-test apparatus for testing the removal of calcareous deposits, according to an embodiment of the invention.

FIG. 1C is an exemplary front view of a calcareous deposit wipe-test apparatus 100 for testing the removal of calcareous deposits, according to an embodiment of the invention. FIG. 1D is an exemplary perspective view of a calcareous deposit wipe-test apparatus 100 for testing the removal of calcareous deposits, according to an embodiment of the invention. FIGS. 1C and 1D both show the motor 200, the replaceable cartridge 400, and the transmission assembly 500 for transmitting energy from the motor 200 to the replaceable cartridge 400. The motor 200 may be an electrical motor having a power output that allows for low speeds and high torque. As shown, the motor 200 includes a motor drive shaft 210 for transmitting rotational energy generated by the motor 200. FIG. 1C also shows a cartridge shaft 410 extending from the cartridge 400 into the transmission assembly 500 (outlined below) to which the shaft 410 is attached by means of shaft coupling 413. As shown the cartridge shaft 410 is supported by a sleeve bearing 412, which is located inside the cartridge 400. The cartridge shaft 410, which protrudes through the cartridge 400, is supported at its other end by the shaft coupling 413.

The transmission assembly 500 operably connects the motor drive shaft 210 to the cartridge shaft 410. As shown in FIG. 1C (also in FIG. 1A), the transmission assembly 500 includes a first sprocket 510 mounted on the motor drive shaft 210. The transmission assembly 500 also includes a second sprocket 520 mounted on a transmission shaft 501, which is connected to the cartridge shaft 410 via the shaft coupling 413. As shown, the transmission shaft 501 is supported at one end by sleeve bearing 414, and it extends into the horizontally extending portion 320 of the frame 300.

As shown, the transmission shaft 501 is connected to the carriage shaft 410, via the sleeve coupling 413, forming a continuous shaft body that is rotatably mounted via the sleeve bearing 412 at one end and sleeve bearing 414 at the other end. The continuous shaft body made up of the transmission shaft 501 and the cartridge shaft 410 extends within and substantially parallel to the horizontally extending portion 320 of the substantially L-shaped chassis 300. FIG. 1C also shows the transmission assembly 500 having a looped chain 530 attached to each of the first sprocket 510 and the second sprocket 520, transmitting rotational energy from the motor drive shaft 210 above to the transmission and cartridge shafts (501, 410) below. As outlined below, during evaluation rotational energy from the motor 200 is used to rotate and wipe a calcareous deposit carrying roller that is mounted on the cartridge shaft 410.

Figure 2A:
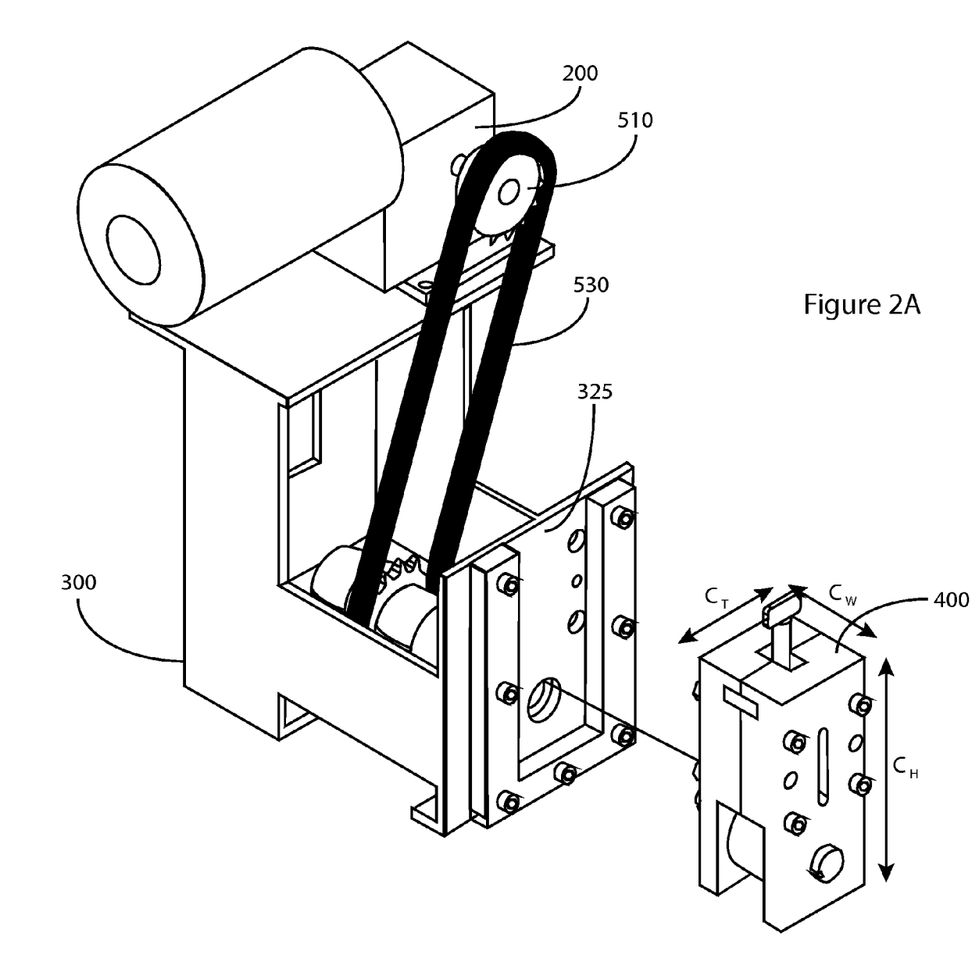
FIG. 2A is an exemplary perspective view of a calcareous deposit wipe-test apparatus with the replaceable cartridge removed, according to an embodiment of the invention.

FIG. 2A is an exemplary perspective view of a calcareous deposit wipe-test apparatus with the replaceable cartridge 400 removed, according to an embodiment of the invention. FIG. 2A shows that the replaceable cartridge 400 having a housing 401. The housing 401 may preferably be made from a non-conductive material. The cartridge 400 may be removably attached to the apparatus 100, via the cartridge side plate 325. FIG. 2A shows the cartridge housing 401 having a width $C_W$, a thickness $C_T$, and a height $C_H$. According to an embodiment of the invention (as outlined with respect to FIG. 1B) the width $C_W$ is about 2.5 in., the thickness $C_T$ is about 2.5 in., and the height $C_H$ is about 6.0 in. It should be noted that according to an embodiment of the invention, there may be a plurality of replaceable cartridges 400, to be used interchangeably. Each of the plurality of cartridges 400 has the structure illustrated in FIGS. 2B and 2C.

Figure 2B:
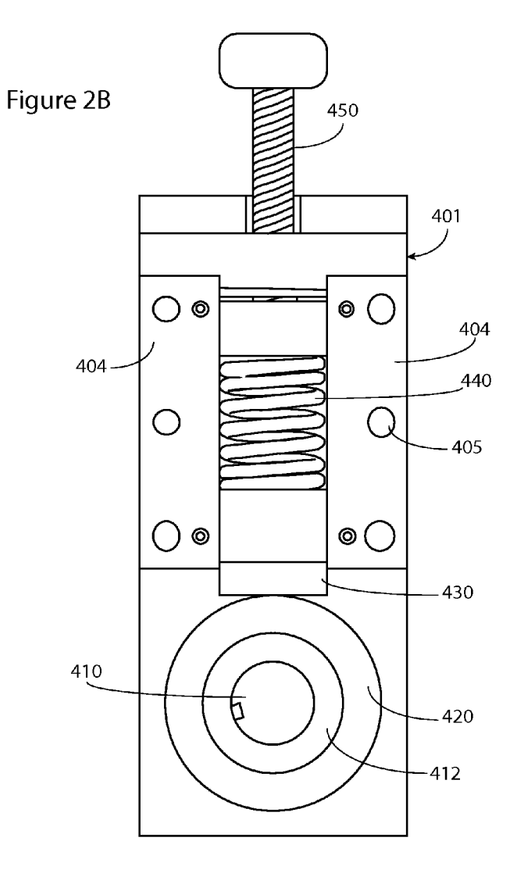
FIG. 2B is an exemplary side view of a replaceable cartridge 400, according to an embodiment of the invention.
Figure 2C:
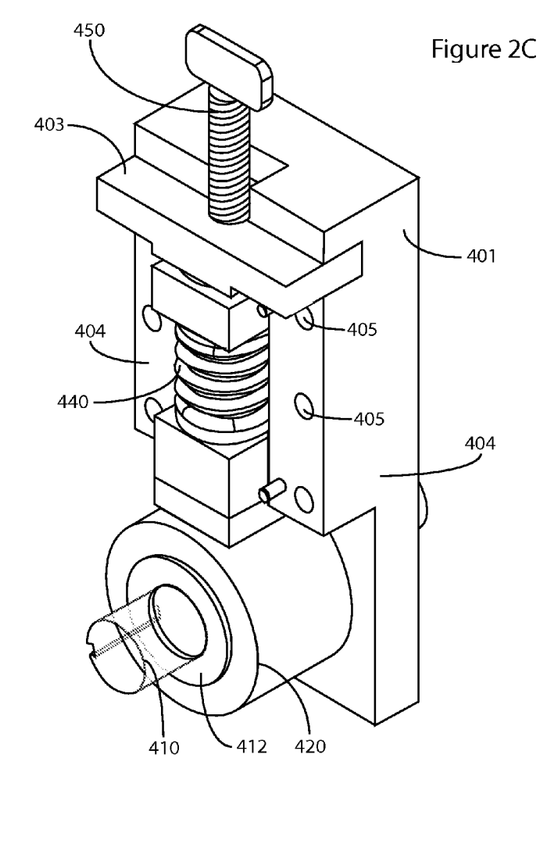
FIG. 2C is an exemplary perspective illustration of a replaceable cartridge 400, according to an embodiment of the invention.

FIG. 2B is an exemplary side view of a replaceable cartridge 400 (with a portion of the housing removed), according to an embodiment of the invention. FIG. 2C is an exemplary perspective illustration of the replaceable cartridge 400 (with a portion of the housing removed), according to an embodiment of the invention. As shown in FIGS. 2B and 2C, the replaceable cartridge includes a housing 401 which as shown in FIG. 1A, may be substantially rectangular. The housing 401 encapsulates the working members of the replaceable cartridge 400. FIGS. 2B and 2C also show attachment openings 405 which may be used in combination with known attachment devices to fasten together different sides of the housing 401. Additionally, the attachment openings 405 in combination with known attachment devices such as bolts, screws, and the like, may be used to removably attach the cartridge 400 to the frame 300. The shaft coupling 413 may provide a clamp-on connection facilitating the operational connection of the cartridge shaft 410 to the transmission assembly 500, when the cartridge 400 is affixed to the frame 300.

As stated above, FIGS. 2B and 2C show the replaceable cartridge 400 with a portion of the housing 401 removed. The replaceable cartridge 400 includes the cartridge shaft 410 positioned within a sleeve bearing 412. FIG. 2 also shows a calcareous deposit roller 420 mounted on the shaft 410. The calcareous deposit roller 420 is for growing calcareous deposits thereon, the removal of which is evaluated in settings simulating real working conditions. Also shown is bearing coupon 430 which presses down on the roller 420. The downward pressing force exerted by the bearing coupon 430 on the roller 420 is due to the biasing assembly within the replaceable cartridge 400. As shown, the biasing assembly includes a load spring 440 having a known spring constant. One end of the load spring 440 contacts the bearing coupon 430. The force of the load spring 440 may be adjusted by a load screw 450 that is connected to the spring. As shown, the load screw 450 may extend through top protrusion 403. As shown the biasing arrangement is wedged between side protrusions 404 and top protrusion 403, which helps to stabilize the arrangement, and also contributes to the compact nature of the overall arrangement.

As stated above, the calcareous deposit wipe-test apparatus 100, as described above with respect to FIGS. 1A-1D, is a small-scale machine used for land-based laboratory testing. The apparatus 100 is analogous to a ship propulsion shaft journal and support bearing, and is used to simulate and evaluate the removal/wiping of calcareous deposits from the shaft of a ship. According to the invention, the calcareous deposit wipe-test evaluation method is performed as outlined below.

Figure 3:
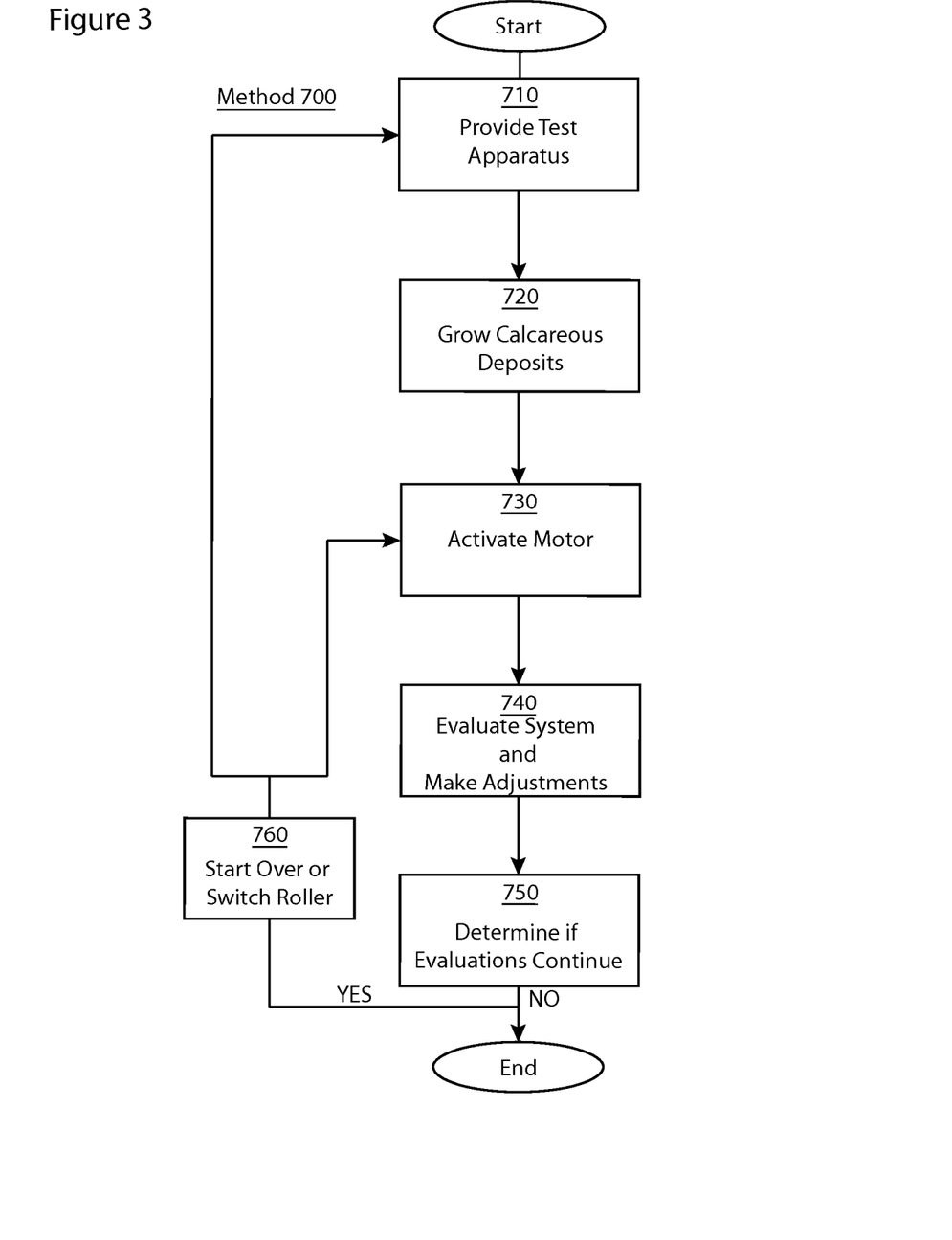
FIG. 3 is an exemplary flow chart showing a calcareous deposit wipe-test evaluation method, according to an embodiment of the invention.

FIG. 3 is a flow diagram, broadly outlining steps involved in the deposit wipe-test evaluation method 700, according to an embodiment of the invention. Step 710 is the providing of the calcareous deposit wipe-test apparatus 100 for testing the removal of calcareous deposits. The apparatus 100 is provided with the elements as outlined above with respect to FIGS. 1A-2. As outlined, the apparatus 100 is provided with a motor 200, a frame 300, a replaceable cartridge 400, a transmission assembly 500, and a trough 600. As stated above, the apparatus 100 may include a plurality of replaceable cartridges 400, to be interchangeably attached to the frame 300, with each of the plurality of cartridges 400 having the structure illustrated in FIG. 2.

Step 720 is the growing of calcareous deposits on the respective calcareous deposit roller 420 of the one or more replaceable cartridges 400. Calcareous deposits may be formed by immersing the respective one or more cartridges 400 in seawater, with the respective roller 420 attached to an electrical current source to grow the calcareous deposits on the surface of the roller 420. As stated above, "seawater" as defined herein refers to any water, naturally occurring or treated, having a known chemical composition range, consistent with that of naturally occurring seawater. It should also be noted that the seawater for the growth of the deposits may be provided in another container (not shown).

According to an embodiment of the invention, step 720, i.e., the forming of the calcareous deposits may be performed on only one replaceable cartridge 400, by attaching the electrical current sources to roller 420. The bearing coupon 430 is loaded during the growing process to form an edge of calcareous growth where the roller 420 starts to contact the bearing coupon 430. The calcareous deposits may be formed on the roller 420 when the replaceable cartridge 400 is attached to the apparatus, as shown in FIG. 1A. Alternatively, the calcareous deposits may be formed when the cartridge 400 is unattached, and is attached afterwards to the frame 300 after the deposits are grown. As stated above, the clamp-on shaft coupling 413 and the bolts 405 or other attachment members, facilitate the attachment of the replaceable cartridge 400 to the frame 300.

According to an embodiment of the invention, step 720, i.e., the forming of the calcareous deposits may be performed on a plurality of replaceable cartridges 400, by attaching the electrical current sources to the respective rollers 420. Utilizing multiple cartridges 400 allows calcareous deposits to be grown simultaneously, after which any of the cartridges 400 may be attached to the apparatus 100 so that evaluations may proceed. As stated above, each bearing coupon 430 is loaded during the growing process to form an edge of calcareous growth where the roller 420 starts to contact the bearing coupon 430. A desired one of the plurality of replaceable cartridges 400 is attached to the frame 300 after the deposit is grown. As stated above, the clamp-on shaft coupling 413 and the bolts 405 or other attachment members, facilitate the attachment of the replaceable cartridge 400 to the frame 300.

Step 730 is the activation of the motor 200 for a predetermined period of time. The motor 200 powers the calcareous deposit roller 420 having the calcareous deposits thereon. As shown in FIG. 1A, the motor 200 is perched above in a dry location, whereas the cartridge 400 is at least partially submerged, with the calcareous deposit roller 420 fully submerged in the water in the trough 600, mimicking actual conditions. Rotational energy from the motor drive shaft 210 is transmitted to the cartridge shaft 410, via the transmission assembly 500. As outlined above, the transmission assembly includes first and second sprockets (510, 520) mounted on the respective shafts (210, 501), and a looped chain 530 attached to each of the first and second sprockets (510, 520), thereby transmitting rotational energy from the motor drive shaft 210 above to the submerged cartridge shaft 410 below. As the roller 420 is rotated, the coupon 430 presses down on the roller 420, thereby wiping off calcareous deposition from the roller 420.

Step 740 is the system evaluation and adjustments stage. Here the workings of the elements of the test apparatus 100 are evaluated during and after the period in which the deposits are wiped off the roller 420. The process is evaluated to determine if adjustments can be made. For example, the force between the bearing coupon 430 and the roller 420 may be adjusted to optimize the wiping of the deposits. Here, the load screw 450 may be used to adjust the compression in the spring 440, which has a known spring force constant. The spring force constant is used to apply the correct load by measuring the compression length through a slot (not shown) in the housing 401. The evaluation may be performed for a predetermined amount of turns. Also, depending on the initial effectiveness of the deposit removal, the amount of turns and the growth time can be varied to determine the full-scale wipe procedure.

At step 750 a determination is made as to whether to end the entire process, i.e., or whether to conduct more evaluations. If the results from the evaluation and adjustments step 740 are satisfactory, then the entire process may be terminated. Alternatively, a decision may be made to conduct more testing, then a determination step 760 is executed. At step 760, it is determined as to whether to repeat the entire process, i.e., restarting at step 710. Alternatively, evaluations may be continued by replacing one replaceable cassette 400 with another replaceable cassette 400 having deposits thereon, after which the process from step 730 onwards are repeated.

It should be noted that FIG. 3 represents the broad steps associated with the deposit wipe-test evaluation method 700. As outlined above, each step illustrated in FIG. 3 may include a plurality of sub-steps. These sub-steps are not represented in the flow chart of FIG. 3, but are outlined in the written description.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A calcareous deposit wipe-test apparatus for testing the removal of calcareous deposits, the apparatus comprising:
   a motor having a motor drive shaft for transmitting rotational energy;
   a replaceable cartridge comprising:
      a cartridge shaft;
      a calcareous deposit roller for growing calcareous deposits thereon; and
      a spring loaded bearing coupon in biased contact with the calcareous deposit roller for removing the calcareous deposits thereon;
   the calcareous deposit wipe-test apparatus further comprising:
      a frame; and
      a transmission assembly extending through the frame connected to each of the motor drive shaft and the cartridge shaft for transmitting rotational energy from the motor shaft to the cartridge shaft thereby rotating the calcareous deposit roller against the spring loaded bearing coupon for removing the calcareous deposits.

2. The calcareous deposit wipe-test apparatus of claim 1, wherein the frame comprises:
   a substantially L-shaped chassis having a vertically extending portion and a horizontally extending portion;
   a motor mounting platform positioned at the top of the vertically extending portion of the substantially L-shaped chassis; and
   a cartridge side plate for removably attaching the replaceable cartridge, wherein the replaceable cartridge is mounted to the cartridge side plate, and the motor is mounted to the motor mounting platform at an end of the vertically extending portion so that the motor is positioned vertically above the replaceable cartridge below and remains dry when the replaceable cartridge is at least partially submerged in seawater.

3. The calcareous deposit wipe-test apparatus of claim 2, wherein the transmission assembly comprises:
   a first sprocket mounted on the motor drive shaft;
   a transmission shaft;
   a second sprocket mounted on the transmission shaft, wherein the transmission shaft is connected to the carriage shaft forming a continuous shaft body extending within and substantially parallel to the horizontally extending portion of the substantially L-shaped chassis; and
   a looped chain attached to each of the first sprocket and the second sprocket, transmitting rotational energy from the motor drive shaft above to the cartridge shaft below.

4. The calcareous deposit wipe-test apparatus of claim 3, wherein the cartridge further comprises a load screw for adjusting the biasing force of the spring loaded bearing coupon.

5. The calcareous deposit wipe-test apparatus of claim 4, further comprising a trough for containing seawater for creating calcareous deposits and to create shipboard operating conditions, wherein the substantially L-shaped chassis is positioned within the trough with the horizontally extending portion is entirely within the trough, and the vertically extending portion extends out and above the trough so that when the trough is filled with seawater the cartridge is at least partially submerged in the seawater and the motor is positioned above the seawater.

6. A calcareous deposit wipe-test evaluation method comprising:
   providing a test apparatus comprising:
      a motor having a motor drive shaft for transmitting rotational energy;
      a plurality of replaceable cartridges, each of the plurality of cartridges comprising:
         a cartridge shaft;
         a calcareous deposit roller for growing calcareous deposits thereon; and
         a spring loaded bearing coupon in biased contact with the calcareous deposit roller for removing the calcareous deposits thereon;
      a frame wherein one of the plurality of replaceable cartridges is attached to the frame; and
      a transmission assembly extending through the frame connected to each of the motor drive shaft and the cartridge shaft of the attached replaceable cartridge for transmitting rotational energy from the motor shaft to the cartridge shaft;
      a trough with seawater therein, wherein the frame is positioned within the trough,
   growing calcareous deposits on the calcareous deposit rollers of the plurality of replaceable cartridges by applying an electrical current to the respective calcareous deposit roller;
   after deposits are formed on the calcareous deposit rollers, activating the motor for a predetermined time, which via the transmission assembly, transmits rotational energy to the calcareous deposit roller of the attached replaceable cartridge, the attached calcareous deposit roller rubbing against the spring loaded bearing coupon, thereby removing the calcareous deposits thereon; and
   evaluating the system and making adjustments during and after the period in which the motor is activated.

7. The calcareous deposit wipe-test method of claim 6 further comprising;
   providing the frame with a substantially L-shaped chassis having a vertically extending portion and a horizontally extending portion, a motor mounting platform positioned at the top of the vertically extending portion of the substantially L-shaped chassis, and a cartridge side plate for removably attaching the replaceable cartridges, wherein the attached replaceable cartridge is mounted to the cartridge side plate, and the motor is mounted at an end of the vertically extending portion so that the motor is positioned vertically above the attached replaceable cartridge below and remains dry when the attached replaceable cartridge is at least partially submerged in seawater to stimulate the growth of calcareous deposits.

8. The calcareous deposit wipe-test method of claim 7 further comprising;
   providing the transmission with a first sprocket mounted on the motor shaft, a transmission shaft, and a second sprocket mounted on the transmission shaft, wherein the transmission shaft is connected to the carriage shaft forming a continuous shaft body extending within and substantially parallel to the horizontally extending portion of the substantially L-shaped chassis, and a looped chain attached to each of the first sprocket and the second sprocket, transmitting rotational energy from the motor drive shaft above to the cartridge shaft below, and wherein the attached replaceable cartridge is further provided with a load screw for adjusting the biasing force of the spring loaded bearing coupon.

9. The calcareous deposit wipe-test method of claim 8, wherein after the evaluating of the system and making adjustments a determination is made as to whether to end the evaluations or to conduct more evaluations.

10. The calcareous deposit wipe-test method of claim 9, wherein in the conducting of more evaluations, the attached replaceable cartridge is removed from the test apparatus, and replaced with another of the plurality of replaceable cartridges.

* * * * *